United States Patent [19]

Bauwens et al.

[11] Patent Number: 4,860,176
[45] Date of Patent: Aug. 22, 1989

[54] LIGHTING DEVICE FOR VEHICLE

[76] Inventors: Frank Bauwens, Guido Gezellestraat 28; Dirk De Bom Van Driessche, Guido Gezellestraat 58/24, both of 9470 Denderleeuw, Belgium

[21] Appl. No.: 130,118
[22] PCT Filed: Mar. 12, 1987
[86] PCT No.: PCT/BE87/00005
  § 371 Date: Nov. 10, 1987
  § 102(e) Date: Nov. 10, 1987
[87] PCT Pub. No.: WO87/05575
  PCT Pub. Date: Sep. 24, 1987

[30] Foreign Application Priority Data

Mar. 13, 1986 [BE] Belgium .............. PV 0/216412

[51] Int. Cl.⁴ .................. B62J 6/00; F21V 33/00
[52] U.S. Cl. ..................... 362/72; 362/192;
  310/67 A; 310/171; 310/257; 290/1 R
[58] Field of Search .......... 310/67 A, 67 R, 156,
  310/254, 168, 171, 257; 362/72, 193, 192; 290/1 R, 1 B

[56] References Cited

U.S. PATENT DOCUMENTS

| 1,338,568 | 4/1920 | Foote | 310/257 |
|---|---|---|---|
| 2,488,021 | 11/1949 | May | 362/193 X |
| 3,459,982 | 8/1969 | Cartier | 310/257 X |
| 4,074,157 | 2/1978 | Face | 310/257 X |
| 4,075,603 | 2/1978 | Snyder | 340/58 |
| 4,191,988 | 3/1980 | Keimakwa | 362/72 |

FOREIGN PATENT DOCUMENTS

| 484554 | 7/1952 | Canada | 310/67 A |
|---|---|---|---|
| 2729446 | 1/1979 | Fed. Rep. of Germany . | |
| 3126150 | 1/1983 | Fed. Rep. of Germany . | |
| 7404798 | 10/1974 | Netherlands . | |
| 7805563 | 11/1978 | Netherlands . | |
| 7803108 | 9/1979 | Netherlands . | |
| 8105164 | 6/1983 | Netherlands . | |
| WO8303584 | 10/1983 | PCT Int'l Appl. | 310/67 A |
| WO8404285 | 11/1984 | PCT Int'l Appl. | 310/67 A |
| 726055 | 3/1955 | United Kingdom | 310/67 A |

Primary Examiner—Ira S. Lazarus
Assistant Examiner—Peggy Neils
Attorney, Agent, or Firm—Cushman, Darby & Cushman

[57] ABSTRACT

Lighting device for a vehicle moving without an engine and on wheels, such as bicycle and tricycle, comprising two lights supplied from a generator (1) comprising a stator and a rotor drivable by a vehicle wheel through projecting members (34) cooperating with the spokes (34) from said wheel, said generator (1) comprising at least sixteen heteropolar poles (27) distributed over 360° facing an induction winding formed by a single coil (26) also extending over 360°, said poles (27) and coil (26) being movably mounted relative to one another, and the stator being so fastened to a vehicle fork (23) that the generator (1) be co-axial with the axis (21) of that wheel driving the rotor.

2 Claims, 4 Drawing Sheets

LIGHTING DEVICE FOR VEHICLE

The present invention relates to a lighting device for a vehicle moving without an engine and on wheels, such as bicycle and tricycle, comprising at least one lamp supplied from a generator, particularly, a dynamo, the generator comprising a stator and a rotor drivable by a vehicle wheel.

Presently, the known lighting devices used for such a vehicle type comprise a generator provided with a rather limited magnetic pole number. These generators are not suitable for this vehicle type which generally moves at a relatively low speed and consequently the voltage obtained from these generators is too low.

The present invention has essentially for object to provide a lighting device which allows obviating this drawback.

For this purpose, the generator comprises at least sixteen magnetic poles distributed over 360° in a heteropolar way facing an induction winding formed by a single coil also extending over 360°, said poles and coil being movably mounted relative to one another, the stator being so fastened to the vehicle frame that the generator be co-axial with the axis of that wheel driving the rotor.

Advantageously, the generator is ring-shaped and thus devoid of rotation shaft, the generator being mounted sidewise relative to the wheel, between the legs from a fork wherebetween said wheel revolves.

In a particular embodiment of the invention, the coil is arranged inside a perforated metal casing.

In a more specific embodiment of the invention, the generator is arranged inside a ring-shaped casing, comprising two parts movable relative to one another, the one part bounding a sidewise-open recess, the other part being comprised of a cover for this recess, said poles being fastened on an inner wall of said casing, the coil being fastened to another wall of said casing.

In a preferred embodiment of the invention, the center of the coil, lies on the wheel axis.

Other features and advantages of the invention will stand out from the following description; this description is only given by way of example and does not limit the scope of the desired protection; the references being used refer to the accompanying figures.

FIG. 3 shows a side view with parts broken-away, from this same substantial part from the embodiment as shown in FIG. 1, with some parts of the bicycle this one is mounted on.

In these various figures, the same reference numerals pertain to the same elements.

Generally, the invention relates to a lighting device for vehicles which move, without engine, on wheels, one or several lights of which are supplied from a generator which is drivable by a wheel from this vehicle. It is here a matter of bicycles, tricycles, etc.

This lighting device is characterized by the fact that at least eight magnetic pole pairs, on the one hand, and a single coil forming the induction winding, on the other hand, extend over a complete 360°-circumference, poles and coil being arranged in a mutually-movable way.

In a more particular embodiment of the invention, the coil is received inside a perforated metal casing, to obtain a generator with claws.

Figure 1:
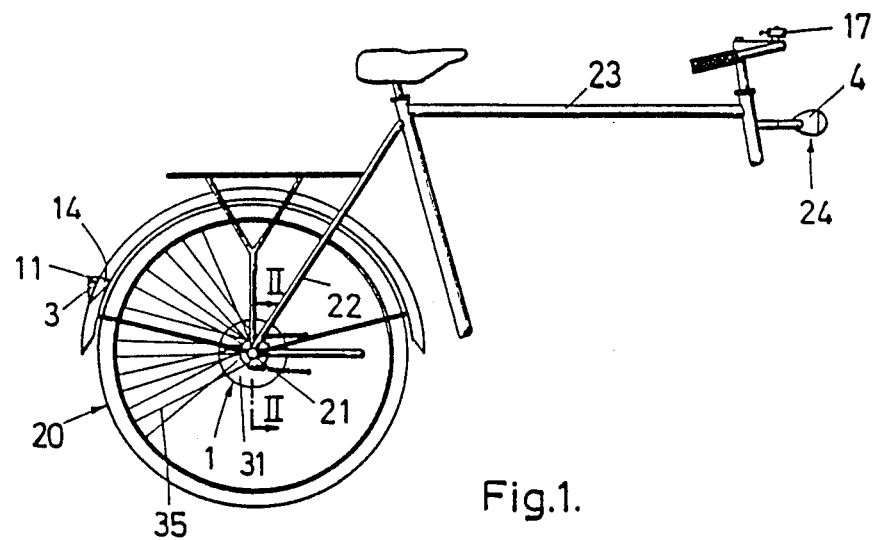
FIG. 1 is a diagrammatic showing of a profile view from part of a bicycle which is provided with a light device according to the invention.
Figure 2:
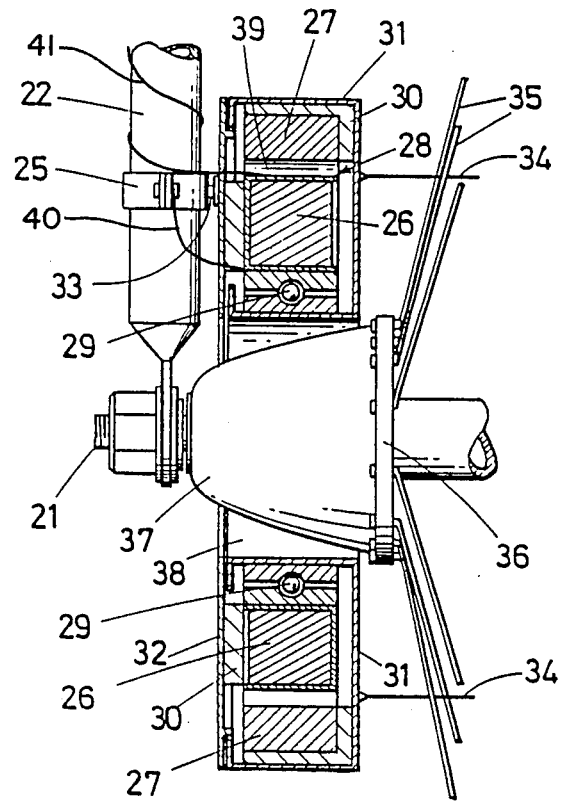
FIG. 2 is a diagrammatic showing of a section view, on a larger scale, along line II—II in FIG. I, from a substantial part of the embodiment as shown in FIG. 1.
Figure 3:
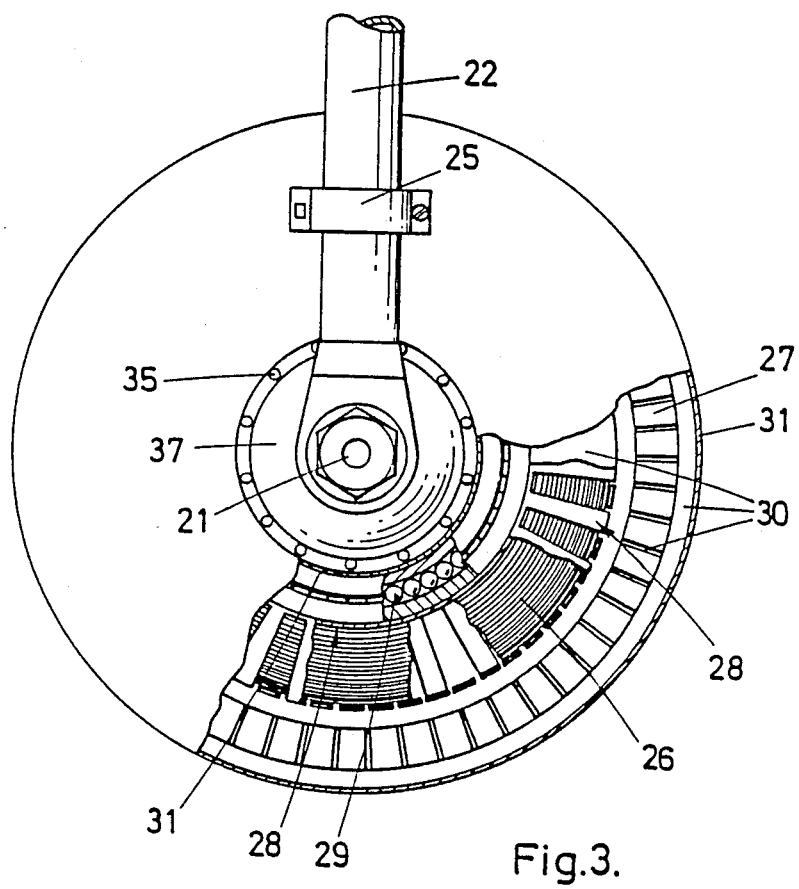

In FIG. 1, one may see the generator 1 which is co-axial with the bicycle back wheel 20, about the fixed axis 21 thereof and between the legs from fork 22. The generator is electrically connected to the back light 3 and front light 4, and possibly to other fittings, such as winkers 14 and hooter 17, through the bicycle frame 23.

The poles 27 have a rectangular cross-section and are located alternately over 360°. The poles 27 are secured with an adhesive material 30 to two inner walls of casing part 31 of generator 1, forming the recess with a U-shaped cross-section. This part forming the recess 31 is movable relative to fork 22. Facing poles 27 and inwardly relative to the set thereof, one finds the perforated metal casing 28 of the stator-forming coil 26, the air-gap 39 separating the poles 27 from the perforated casing 28 of the coil 26, which generally extends over a complete 360°-circumference about the axis of generator 1.

The perforated casing 28 of coil 26 is fastened to the inner side of the part formed by a cover 32 for said recess, with adhesive material 30.

Securing the generator 1, which is ring-shaped and is thus devoid of rotation shaft, to fork 22 occurs with a fastening collar 25, which is joined to the fixed casing part from generator 1 by a clamping screw 33. The fixed part from the generator casing is formed by the cover 32. To insure a good contact to frame 23 connecting the lighting device to ground, the collar is made from a good-conducting metal.

To lower the friction forces due to the relative movement between the perforated casing 28 and the recess-forming part 31, rolling bearings 29 are provided therebetween. Ball bearings will preferably be used.

The U-shaped rotor part 31 from the generator casing forming the rotor, is further provided on the outer wall thereof, with projecting driving members 34 which cooperate with the spokes 35 from the moving bicycle wheel to turn the rotor 31 comprised of poles 27.

Between the casing U-shaped part and the projecting part 37 from the wheel hub 36, there always remains a space 38.

Figure 4:
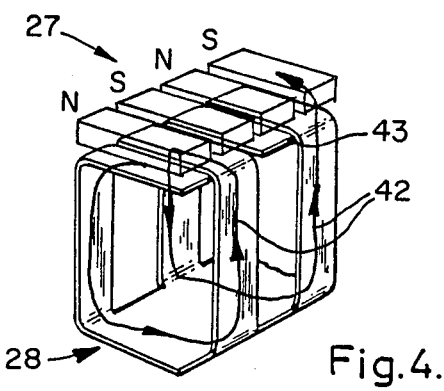
FIG. 4 shows a perspective view of the perforated metal casing.

The coil 26 is wound inside the ring-like space bounded by the perforated metal casing 28, to form turns the respective centers of which lie on the generator axis. As shown in FIG. 4, the rotation of poles 27 creates lines of flux 42 within coil 26, disposed within metal casing 28. It should be noted that the path of lines of flux 42 are induced in coil 26 by the alternating perforations 43 in such a manner that flux is formed spirally around the coil 26. It can be appreciated that such spiral formation of flux results in increased magnetic field formation efficiencies since flux is forced to circulate completely around and through the coil 26.

The electric circuit of the lighting device comprises a generator 1 for supplying the back and front lights 3, 4 from a bicycle, with a switch 10 which is controllable by hand. Electrical connection is made to back and front lights 3 and 4 through leads 41 and 42 connected to coil 26.

Integrating a re-chargeable battery 2 in the device electric circuit 2 allows avoiding the lights, 3, 4 going out when the bicycle stops and retaining constant the light intensity.

The lights 3, 4 are supplied from the generator 1 or battery 2 through two contacts 8, 9 which are controlled by a relay 7. A voltage-stabilizer 5 is provided at the output from generator 1, to prevent the voltage exceeding some level, the stabilizer being preceded by a rectifier 5'.

The battery 2 is provided with a charger 6' and a voltage indicator 6 which controls whether the battery voltage drops below some level. If this is the case, the indicator 6 couples a pulse to charger 6' to charge the battery 2 again up to the level of the voltage-stabilizer 5 and it is then automatically unconnected. The charger 6' proper thus serves to charge the battery 2 back, without damaging same, up to the rated maximum efficiency thereof.

An additional possibility of interest is the stop light 11 with the corresponding switch 12 which is controlled by the brake device, not shown in the figure, from the vehicle.

Other possible fittings are the winking lights 14, a hooter 17, etc., all said component being associated to the hand-controlled switches thereof, and connected in parallel with the lights 3, 4 and the switch 10 thereof.

Figure 5:
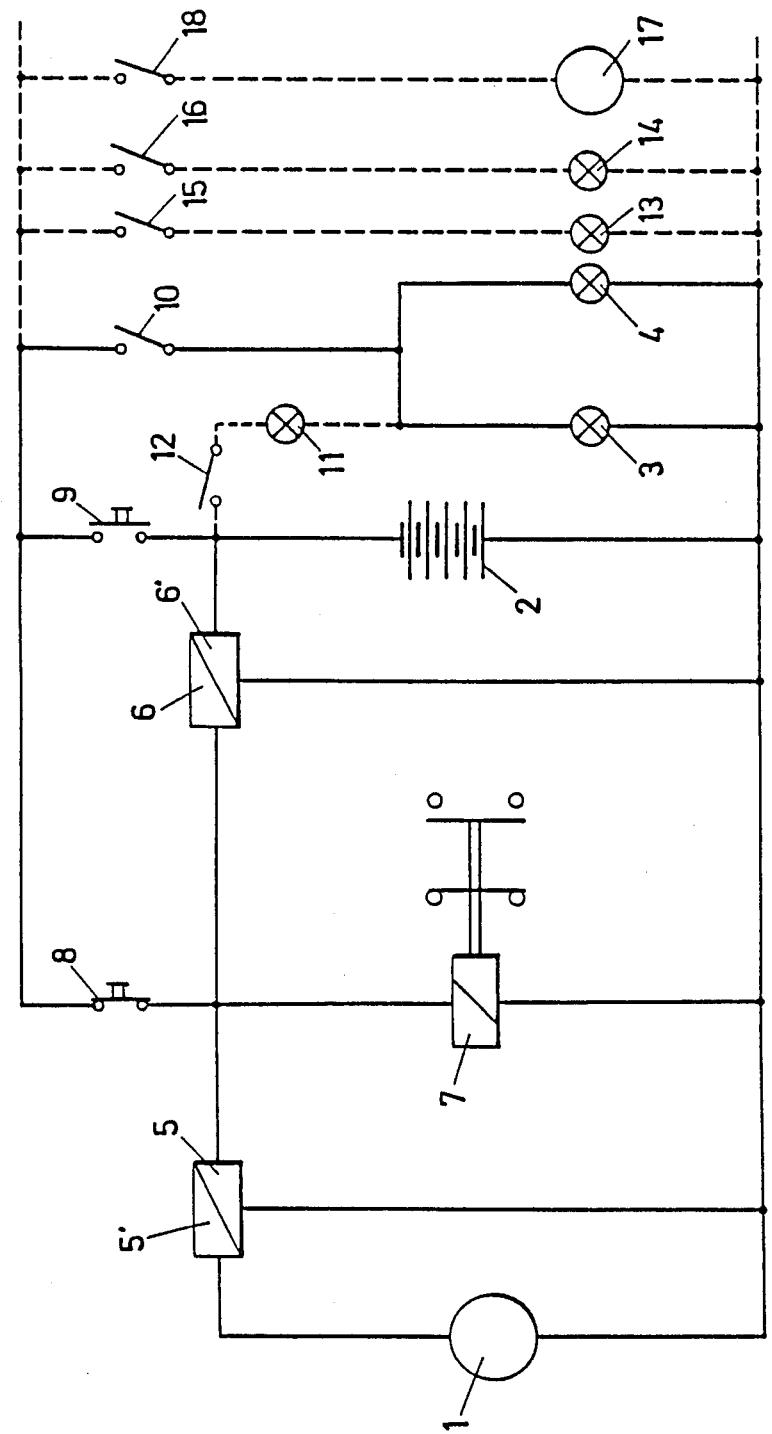
FIG. 5 is a diagrammatic drawing of the electric diagram from a lighting device according to a first embodiment of the invention.
Figure 6:
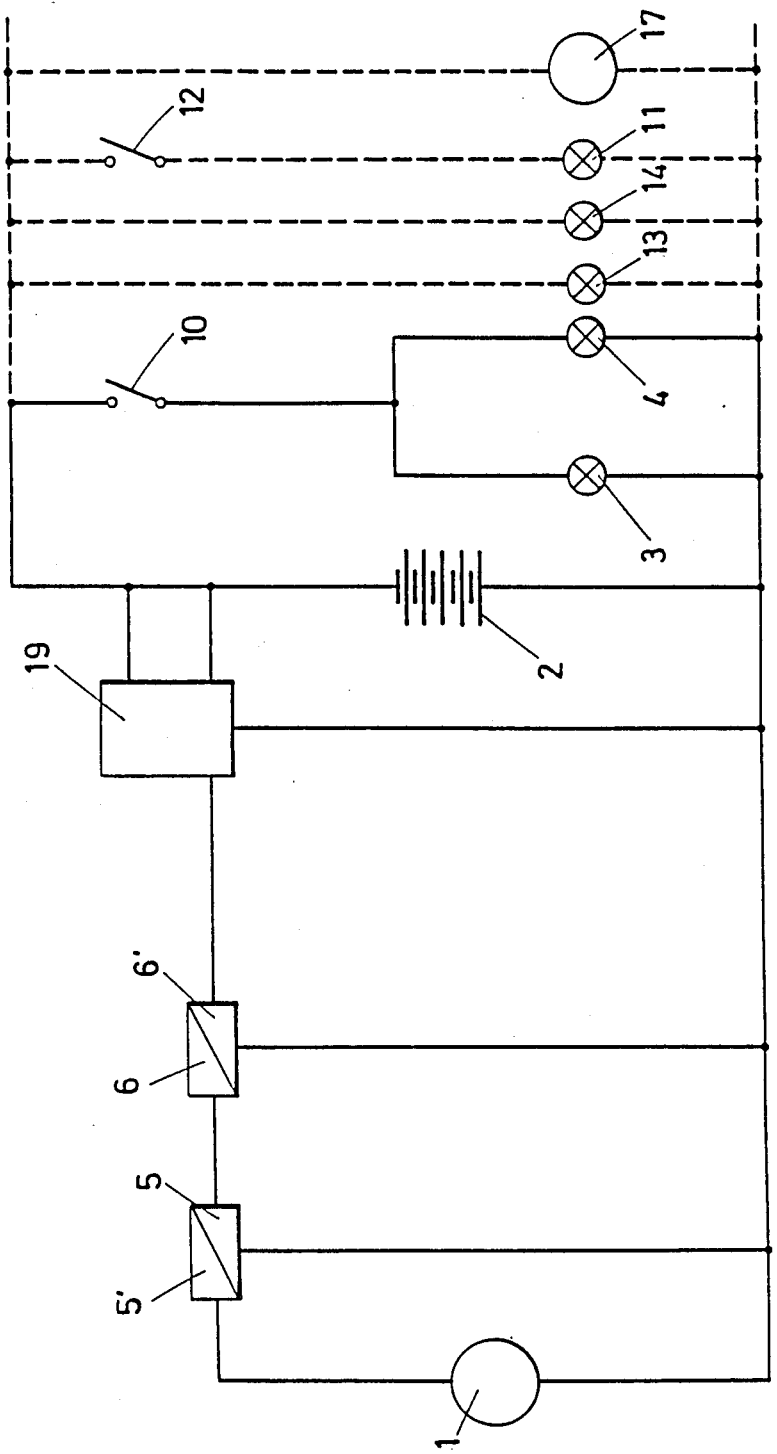
FIG. 6 is another diagrammatic showing of the electric diagram according to another embodiment of the invention.

FIG. 5 shows an electric diagram similar to the one shown in FIG. 4. The electro-mechanical switching components, such as relays and switches, are replaced therein by an electronic switch 19. The voltage-stabilizer 5 is formed therein by an integrated circuit which further matches the light impedance to the generator, to let these lights be supplied with a constant power from the generator. This integrated circuit may be received inside the head-light 24.

In the same way, the charger 6' and voltage indicator 6 may possibly be comprised of a single integrated circuit.

EXAMPLE

The generator comprises 64 alternating poles the delivered power of which is ±15 watts. The battery is a nickel-cadmium type and comprises five cells from 1.2 volts each. The voltage-stabilizer controls whether a voltage threshold of 6 volts is not exceeded. The voltage indicator controls whether the binary voltage does not drop below 5.5 volts.

Regarding the generator size, the outer diameter is 120 mm and the inner diameter is 45 mm. The thickness is 14 mm. The parts forming the generator casing as well as the projecting driving members are made from PVC or aluminum.

Due to the high pole number, there is obtained a generator which is well suited to the relatively low speeds of the vehicles being considered.

On the other hand, the co-axial arrangement of the generator allows to strongly lower the frictions generated by the coupling of the wheel revolution movement to the generator rotor.

Moreover, by making use of two perforated metal casings, the induced eddy currents are substantially reduced.

Further, due to the use of a single coil, the generator structure becomes much simpler. On the other hand, due to the lack of coil heads, substantial copper savings are obtained, lowering at the same time the weight. In the same way, the use for the coil, of a suitably-perforated metal casing also advantageously lowers the generator weight.

Finally, by arranging the generator between the fork legs, stealing same is made more difficult.

The above-described embodiments have only for object to make clear a possible application of the lighting device according to the invention.

The invention is thus in no way limited to the above-described embodiment and within the scope of the desired protection, many changes might be considered, notably as regards the shape, size and selection of the materials from some parts comprising the lighting device.

For instance, the driving means might be provided at the free end thereof, with fastening means wherewith they can be removably secured to the spokes. This allows avoiding impacts when starting up, stopping, or generally as the vehicle accelerates.

What is claimed:

1. An electrical generator adapted for use with a standard wheeled bicycle, said generator disposed on an axle and a hub of a wheel of said bicycle, wherein the revolution of said hub around said axle as said wheel revolves enables said generator to output electricity, said generator comprising:
   a magnetic field induction assembly and a stator assembly;
   said stator assembly circumferentially disposed on said axle of said wheel; said stator assembly comprising a conductive coil disposed within a multi-sided metal casing, said casing having a plurality of apertures alternately formed on at least two sides thereof;
   said magnetic field induction assembly comprising a plurality of alternately opposed magnetic poles circumferentially disposed on said hub of said wheel, said magnetic field assembly circumferentially enclosing said stator assembly in a face to face relationship whereby rotation of said hub correspondingly rotates said magnetic field induction assembly around said stator assembly such that said alternately opposed magnetic poles pass over said plurality of apertures thereby inducing a magnetic field in said conductive coil through said plurality of apertures formed in said multi-sided metal casing.

2. An electrical generator as set forth in claim 1, wherein said multi-sided metal casing further comprises:
   alternately disposed, interconnected and spaced apart U-shaped members formed to contain said coil wherein said apertures are spaced apart on at least two sides of said casing to form a spiral path for said magnetic field induction in said coil.

* * * * *